(12) United States Patent
Zhang et al.

(10) Patent No.: US 9,596,527 B2
(45) Date of Patent: Mar. 14, 2017

(54) METHOD AND APPARATUS FOR UPDATING AND SWITCHING BETWEEN BIT LOADING PROFILES FOR TRANSFER OF DATA FROM AN OPTICAL NETWORK TO NETWORK DEVICES IN A COAXIAL CABLE NETWORK

(71) Applicant: Marvell World Trade LTD., St. Michael (BB)

(72) Inventors: Jin Zhang, Pleasanton, CA (US); Kok-Wui Cheong, Los Altos, CA (US)

(73) Assignee: Marvell World Trade Ltd., St. Michael (BB)

( * ) Notice: Subject to any disclaimer, the term of this patent is extended or adjusted under 35 U.S.C. 154(b) by 147 days.

(21) Appl. No.: 14/533,501

(22) Filed: Nov. 5, 2014

(65) Prior Publication Data
US 2015/0125147 A1    May 7, 2015

Related U.S. Application Data

(60) Provisional application No. 61/900,532, filed on Nov. 6, 2013.

(51) Int. Cl.
*H04B 10/2581*    (2013.01)
*H04Q 11/00*    (2006.01)

(52) U.S. Cl.
CPC .............................. *H04Q 11/0067* (2013.01)

(58) Field of Classification Search
CPC . H04B 10/2581; H04L 5/0007; H04L 5/0046; H04L 12/2861
USPC ......... 370/465, 252; 375/222, 227, 257, 260
See application file for complete search history.

(56) References Cited

U.S. PATENT DOCUMENTS

2014/0079399 A1*  3/2014  Goswami ........... H04Q 11/0067
                                                                  398/76

\* cited by examiner

*Primary Examiner* — Jamal Javaid

(57) ABSTRACT

A conversion module including physical layer and control modules. The physical layer module, via an optical network, receives first data from a service provider. The control module, via a coaxial cable network: transmits the first data, via sub-carriers, from the conversion module to a first network module according to a first bit loading profile; requests from the first or second network module a report that indicates channel conditions respectively for the sub-carriers; based on the request, receives the report; updates a second bit loading profile based on the report; transmits, to the first or second network module, the updated second bit loading profile or a difference between the first and updated second bit loading profiles; and subsequent to performing a switch over between the first and second bit loading profiles, transmit second data according to the updated second bit loading profile to the first or second network module.

20 Claims, 8 Drawing Sheets

METHOD AND APPARATUS FOR UPDATING AND SWITCHING BETWEEN BIT LOADING PROFILES FOR TRANSFER OF DATA FROM AN OPTICAL NETWORK TO NETWORK DEVICES IN A COAXIAL CABLE NETWORK

CROSS-REFERENCE TO RELATED APPLICATIONS

This application claims the benefit of U.S. Provisional Application No. 61/900,532, filed on Nov. 6, 2013. The entire disclosure of the application referenced above is incorporated herein by reference.

FIELD

The present disclosure relates to Ethernet passive optical networks (EPONs).

BACKGROUND

A service provider can provide Internet access and telephone services to end user devices (e.g., televisions, computers, and telephones) via telephone lines (e.g., twisted wire cables) of a telephone network. The Internet access and telephone services may be provided over the telephone network via digital subscriber line (DSL) connections. As an alternative, Internet access and telephone services can be provided via a coaxial cable network. The coaxial cable network connects a central office of a service provider to end user devices via coaxial cables. The telephone network can include power splitters and transfer power between a service provider and end user devices. The coaxial cable network can include power amplifiers. The power splitters and power amplifiers are used to increase and/or maintain signal strength over extended distances. Communication speeds of the telephone network and the coaxial cable network are limited especially over a "last mile" of a network to an end user device. This is referred to as the "last mile problem".

To resolve the last mile problem, a passive optical network (PON) can provide high-speed (e.g., greater than 1 giga-bit per second (Gbps)) broadband communication speeds over the "last mile" of a network to an end user device. A PON can include passive splitters that are not powered. A PON does not transfer power between a service provider and the passive splitters. In September of 2009, the Institute of Electrical and Electronics Engineers (IEEE) approved an Ethernet PON (EPON) standard, which is directed to providing a downstream communication speed of 10 Gbps for data and an upstream communication speed of 10 Gbps or 1 Gbps. Downstream communication refers to transfer of data from an optical line terminal of a service provider to an optical network device (sometimes referred to as an optical network unit). The optical network device can be located in a residential or commercial building, can be used as a cable modem, and can be connected to an end user device. Upstream communication refers to transfer of data from the optical network device to the optical line terminal.

Since the approval of the EPON standard, the deployment of EPON devices has been gradually expanding, mainly in residential and commercial areas with new construction. In most areas where residential and commercial buildings are established and equipped with coaxial networks, the cost of installation for EPON devices has prevented upgrading to the EPON standard.

SUMMARY

A conversion module is provided and includes a physical layer module and a control module. The physical layer module is configured to, via an optical network, receive first data from a terminal of a service provider. The control module is configured to, via a coaxial cable network: transmit the first data, via sub-carriers, from the conversion module to a first network module according to a first bit loading profile; request from the first network module or a second network module a report, where the report indicates channel conditions respectively for the sub-carriers; and based on the request, receive the report from the first network module or the second network module. The first bit loading profile specifies a first number of bits to transmit per sub-carrier. The control module is further configured to: update a second bit loading profile based on the report; transmit, to the first network module or the second network module, the updated second bit loading profile or a difference between the first bit loading profile and the updated second bit loading profile; and subsequent to performing a switch over between the first bit loading profile and the second bit loading profile, transmit second data according to the updated second bit loading profile to the first network module or the second network module. The second bit loading profile specifies a second number of bits to transmit per sub-carrier.

In other features, a first network module of an end user device is provided. The first network module includes a first register and a control module. The first register is configured to store a first bit loading profile and a second bit loading profile. The first bit loading profile indicates bit loading for each of sub-carriers of a first channel. The second bit loading profile indicates bit loading for each of the sub-carriers of the first channel. The control module is configured to: via a coaxial cable network and according to the first bit loading profile, receive first data on the plurality of sub-carriers of the first channel, where the data is received from a terminal of a service provider via an optical network and a conversion module; receive a request for a report from the conversion module on a second channel; and based on the request, determine a channel condition for each of the plurality of sub-carriers; generate the report to include the channel conditions for the plurality of sub-carriers; transmit the report to the conversion module on the second channel. The control module is further configured to: based on the report, receive from the conversion module on the second channel (i) an updated version of the second bit loading profile, or (ii) a difference between the first bit loading profile and the updated version of the second bit loading profile; and according to the second bit loading profile or the difference, receive second data on the plurality of sub-carriers of the first channel from the conversion module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

The following examples are directed to providing an EPON over coax (EPOC) network including communication between optical network devices of an EPON and coaxial cable network devices of a coaxial cable network. The term "coax" herein refers to a coaxial cable or coaxial cables. The EPOC allows established end users connected to coaxial cable networks to connect to EPONs and take advantage of high-speed communication associated with the EPONs. EPON frames of data are transmitted between the EPONs and the coaxial cable networks.

Figure 1:
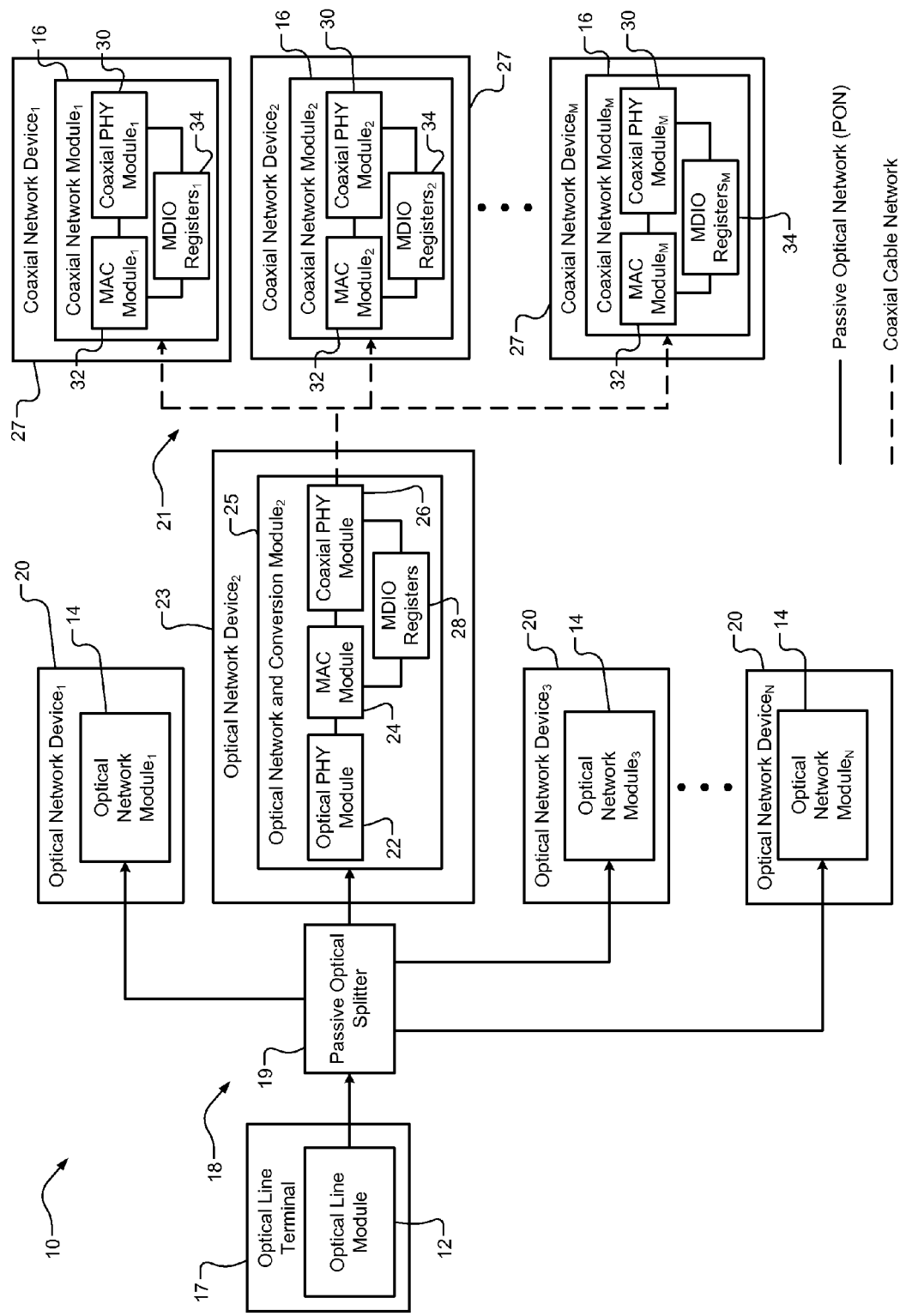
FIG. 1 is a functional block diagram of an EPON over coax (EPOC) network in accordance with an embodiment of the present disclosure.

FIG. 1 shows an EPOC network 10. The EPOC network 10 includes an optical line module (OLM) 12 of a service provider, optical network modules$_{1-N}$ (ONMs) 14, and coaxial network modules$_{1-M}$ (CNMs) 16. The OLM 12 may be located in an optical line terminal 17 and is connected to the ONMs 14 via a PON 18 and may be located at a central office of the service provider. The PON 18 may be an EPON and include optical fiber cables and/or one or more passive optical splitters (a single passive optical splitter 19 is shown) connecting the OLM 12 to the ONMs 14. Some of (or first) ones of the ONMs 14 may be (i) installed in residential or commercial buildings, and (ii) connected to or included in end user devices (e.g., optical network devices 20). Other (or second) ones of the ONMs 14 (referred to as conversion modules) may be connected to CNMs via a coaxial cable network 21 and located in other optical network devices (referred to as intermediate optical network devices). One intermediate optical network device 23 is shown having a conversion module (identified as optical network and conversion module$_2$) 25. Each end user device receives broadband data either via one of the ONMs 14 and/or one of the CNMs 16. The CNMs 16 may be located within respective coaxial network devices 27.

The conversion modules may be installed in or near, for example, a residential community or a multiple dwelling unit (MDU). The CNMs 16 may be (i) located in residential or commercial buildings, and (ii) connected to or included in end user devices. The coaxial cable network 21 includes coaxial cables connecting the conversion modules to the CNMs 16. The PON 18 and the coaxial cable network 21 may have "tree-like" structures, as shown. The PON 18 and the coaxial cable network 21 are used to provide broadband data to the end user devices.

During downstream communication, the conversion modules convert optical signals in a time domain and received from the OLM 12 to coax signals in a frequency domain. The coax signals are transmitted from the conversion modules to the CNMs 16. During upstream communication, the conversion modules convert coax signals to optical signals. Each of the conversion modules may be a single module as shown or may include an ONM in communication with a coaxial line module (sometimes referred to as a coaxial line terminal). If a conversion module includes an ONM and a coaxial line module, the ONM and the coaxial line module may have respective PHY modules, which are in communication with each other.

The conversion modules may each include an optical physical layer (PHY) module 22, a media access control (MAC) module 24, a coaxial PHY module 26, and management data input/output (MDIO) registers 28. The optical PHY module 22 receives time division multiplexing access (TDMA) signals from the OLM 12, demultiplexes the TDMA signals and forwards the demultiplexed signals to the MAC module 24. The TDMA signals may have time slots with respective sets of data for respective network devices (e.g., the network devices 19, 21, 23). The MAC module 24 may then forward the demultiplexed signals to the coaxial PHY module 26, which may convert the demultiplexed signals into orthogonal frequency division multiplexing (OFDM) signals.

The coaxial PHY module 26 transmits the OFDM signals to the CNMs 16. The MDIO registers store channel conditions and bit loading profiles. The channel conditions may include frequency responses of sub-carriers of the OFDM signals, signal-to-noise ratios of the sub-carriers, modulation error rates of the sub-carriers, and/or other suitable channel conditions as is further described below. Bit loading profiles refer to a number of bits transmitted per sub-carrier. The bit loading profiles may include broadcast profiles, non-broadcast profiles, and/or CNM set specific profiles. Broadcast profiles are profiles that are transmitted to all of the CNMs 16 and used for transmission of data to all of the CNMs. Non-broadcast profiles are profiles transmitted to one or more of the CNMs 16 and used for transmission of data to the one or more CNMs. CNM set specific profiles are profiles transmitted to one or more CNMs in a set of CNMs and used for transmission of data to the one or more CNMs in the set of CNMs. The bit loading profiles are further described below. The OFDM signals are generated based on one or more of the channel conditions and/or one or more of the bit loading profiles.

The CNMs 16 may each include a coaxial PHY module 30, a MAC module 32, and MDIO registers 34. The coaxial PHY module 30 demodulates OFDM signals received from one or more of the coaxial PHY modules 26. The OFDM signals may be demodulated and/or processed based on one or more of the bit loading profiles to generate demodulated signals. The bit loading profiles may be stored in the MDIO registers 34. The MDIO registers 34 may store channel condition reports (hereinafter referred to as "reports"). Each of the reports may include channel condition values for each sub-carrier over which the corresponding CNM receives OFDM signals. The coaxial PHY module 30 may transmit the channel condition reports to one or more of the coaxial PHY modules 26. The demodulated signals are forwarded to the MAC module 32.

Figure 2:
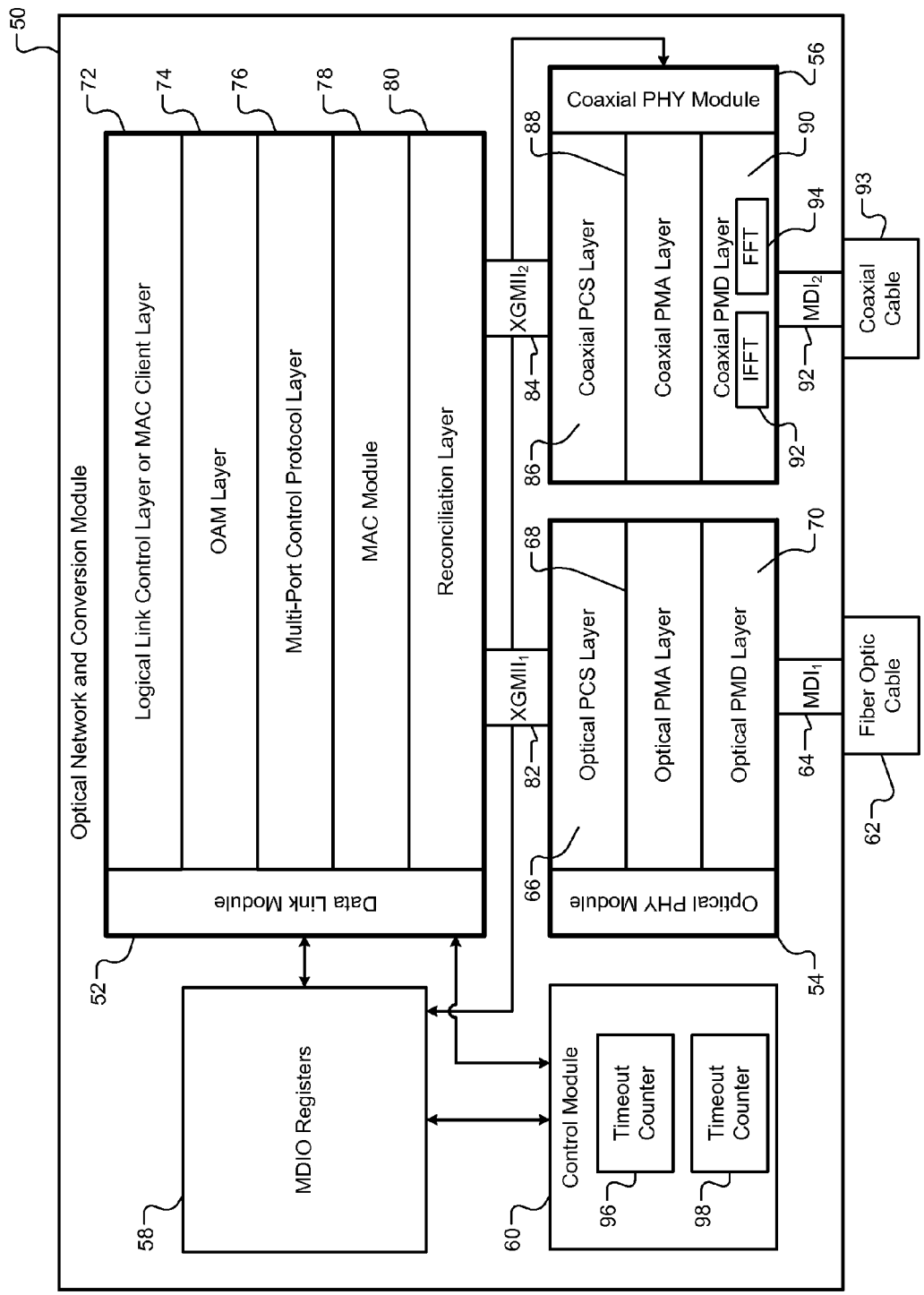
FIG. 2 is a functional block diagram of an optical network module in accordance with an embodiment of the present disclosure.

Referring also to FIG. 2, which shows an optical network (or conversion) module 50 that may be used in replacement of one or more of the conversion modules of FIG. 1. The conversion module 50 includes a data link module 52, an optical PHY module 54, a coaxial PHY module 56, and MDIO registers 58. The conversion module 50 may also include a control module 60. The control module 60 may include one or more of the modules 52, 54, 56 or may be separate from the modules 52, 54, 56, as shown. Each of the modules 52, 54, 56 includes multiple layers. Each of the layers may be referred to as a module. The coaxial PHY module 56 may include the MDIO registers 58.

The optical (first) PHY module 54 is in communication with a fiber optic cable 62 of a PON via a first medium dependent interface (MDI) 64. The optical PHY module includes an optical physical coding sublayer (PCS) layer 66, an optical physical medium attachment (PMA) layer 68, and an optical physical medium dependent (PMD) layer 70. The optical PCS layer 66 may generate PHY headers, perform coding, and/or define data throughput speeds. The optical PMA layer 68 may perform signal scrambling and descrambling and forward error correction coding and decoding. The optical PMD layer 70 may (i) perform signal encoding and decoding, (ii) control bit timing, and (iii) transmit signals to and receive signals from the PON via the first MDI 64. For communication between the OLM 12 and the conversion module 50, the PMD layer 70 may control demultiplexing and/or generation of TDMA signals received from and/or transmitted to the OLM 12. As an example, each of the ONMs 14 and/or CNMs 16 may have respective time slots and signals transmitted to and/or received from the OLM 12 may be transmitted in the respective time slots.

The data link module 52 may include (i) a logical link control layer (or medium access control (MAC) client layer) 72, (ii) an operations, administration, and maintenance (OAM) layer 74, a multi-port control protocol (MPCP) layer 76, a MAC module (or MAC layer) 78, and a reconciliation layer 80. The logical link control layer 72 may multiplex protocols running on the data link module 52, and optionally provide flow control, acknowledgment, and error notification. The OAM layer 74 may perform system troubleshooting, fault management and performance monitoring. The MPCP layer 76 controls operations of the MAC module 78. The MPCP layer 76 (i) provides a time reference to synchronize the ONMs 14, and (ii) controls discovery of CNMs 16, and bandwidth and time slot assignments for the CNMs 16. A MAC layer protocol and a MPCP may be used to achieve TDMA processing, which is carried out via the optical PHY module 54 and the data link module 52.

The logical link control layer 72 may provide addressing and control of data links. The MAC module 78 may provide channel access control and communicates with the PHY modules 54, 56 via the reconciliation layer 80 and respective interfaces 82, 84, such as 10 giga bit media independent interfaces (XGMIIs). The reconciliation layer 80 may process PHY local and remote fault messages and handle double data rate (DDR) conversions.

The coaxial (second) PHY module 56 includes a coaxial PCS layer 86, a coaxial PMA layer 88, and a coaxial PMD layer 90. The coaxial PCS layer 86 may generate PHY headers, perform coding, and/or define data throughput speeds. The coaxial PMA layer 88 may perform signal scrambling and descrambling and forward error correction coding and decoding. The coaxial PMD layer 90 may (i) perform signal encoding and decoding, (ii) control bit loading, (iii) perform signal modulation, and (iv) transmit signals to and receive signals from the coaxial cable network via a second MDI 92. The second MDI 92 is connected to a coaxial cable 93.

The coaxial PMD layer 90 may control data packet processing and generation of OFDM signals and transmit the OFDM signals to the CNMs 16. The coaxial PMD layer 90 may also receive OFDM signals from the CNMs 16. For downstream communication, the coaxial PMD layer 90 may perform Ethernet framing and line coding to generate Ethernet signals for transmission to the CNMs 16. The CNMs 16 may filter respective Ethernet frames from the Ethernet signals. The coaxial PMD layer 90 may include a Fast Fourier Transform (FFT) device 94 and an inverse Fast Fourier Transform (IFFT) device 96, which may be used for demodulation and modulation of the OFDM signals. The layers 86, 88, 90 may access parameters and/or other information stored in the MDIO registers 58 including channel conditions, bit loading profiles, etc.

Although two PHY modules 54 and 56 are shown, the PHY modules 54 and 56 may be combined into a single PHY module. If the conversion module 50 includes a single PHY module, the PHY module may have (i) a single interface (e.g., a XGMII) for communication with the data link module 52; the first MDI 64 for communication with the PON; and the second MDI 92 for communication with the coaxial cable network.

The control module 60 may include a timeout counter 96 and a report counter 98. The timeout counter 96 may be used for determining when to generate a request signal for a status update of a report being generated. The report counter 98 may be used to determine whether to resend a request to generate a report. The counters 96 and 98 are further described below with respect to FIGS. 6 and 8.

Figure 3:
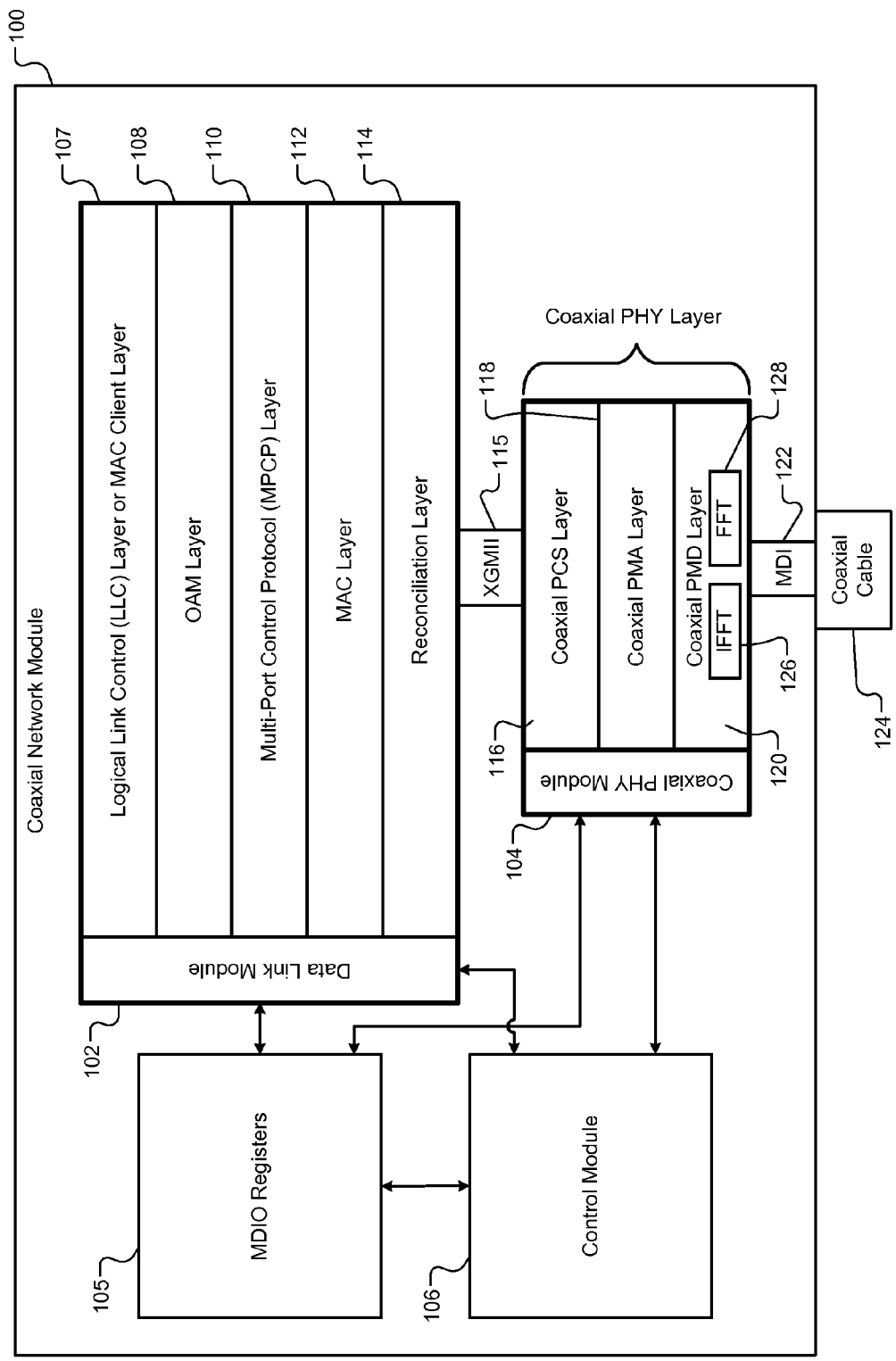
FIG. 3 is a functional block diagram of a coaxial network module in accordance with an embodiment of the present disclosure.

Referring also to FIG. 3, which shows a CNM 100 that may replace one or more of the CNMs 16 of FIG. 1. The CNM 100 includes a data link module 102, a coaxial PHY module 104, MDIO registers 105 and may include a control module 106. The control module 106 may include the data link module 102 and/or the coaxial PHY module 104. The coaxial PHY module 104 may include the MDIO registers 105. Each of the data link module 102 and the coaxial PHY module 104 includes multiple layers. Each of the layers may be referred to as a module. The data link module 102 may include a logical link control layer (or a MAC client layer) 107, an OAM layer 108, a MPCP layer 110, a MAC module (or MAC layer) 112, and a reconciliation layer 114. The layers 107, 108, 110, 112, 114 may perform similar to the layers 72, 74, 76, 78, 80. The reconciliation layer 114 is connected to the coaxial PHY module via an interface 115 (e.g., a XGMII).

The coaxial PHY module 104 may include a coaxial PCS layer 116, a coaxial PMA layer 118, and a coaxial PMD layer 120. The coaxial PCS layer 116 may generate PHY headers, perform coding, and/or define data throughput speeds. The coaxial PMA layer 118 may perform signal scrambling and descrambling and forward error correction coding and decoding. The coaxial PMD layer 120 may (i) perform signal encoding and decoding, (ii) perform signal modulation, and (iii) transmit signals to and receive signals from the coaxial cable network via a MDI 122. The MDI 122 is connected to a coaxial cable 124. The coaxial PMD layer 120 may control data packet processing and generation of OFDM signals and transmit the OFDM signals to a conversion module (e.g., one of the conversion modules 23, 50). The coaxial PMD layer 120 may also receive OFDM signals from the conversion module. The coaxial PMD layer 120 may include an IFFT device 126 and a FFT device 128 for modulation and demodulation of OFDM signals.

The coaxial PMD layer 90 of the conversion module, the coaxial PMD layers (e.g., the coaxial PMD layer 120) of the CNMs 16 and the coaxial cable network 21 provide an OFDM transmission system. In the OFDM transmission system, streams of data are transmitted in the form of OFDM signals between the coaxial PMD layer 90 and the coaxial PMD layers of the CNMs 16. Each of the streams of data may be divided into a number of sub-streams, and modulated onto sub-carriers using IFFT devices (e.g., the IFFT devices 96, 126) to generate OFDM signals. The received OFDM signals may be demodulated using FFT devices (e.g., FFT devices 94, 128).

Figure 4:
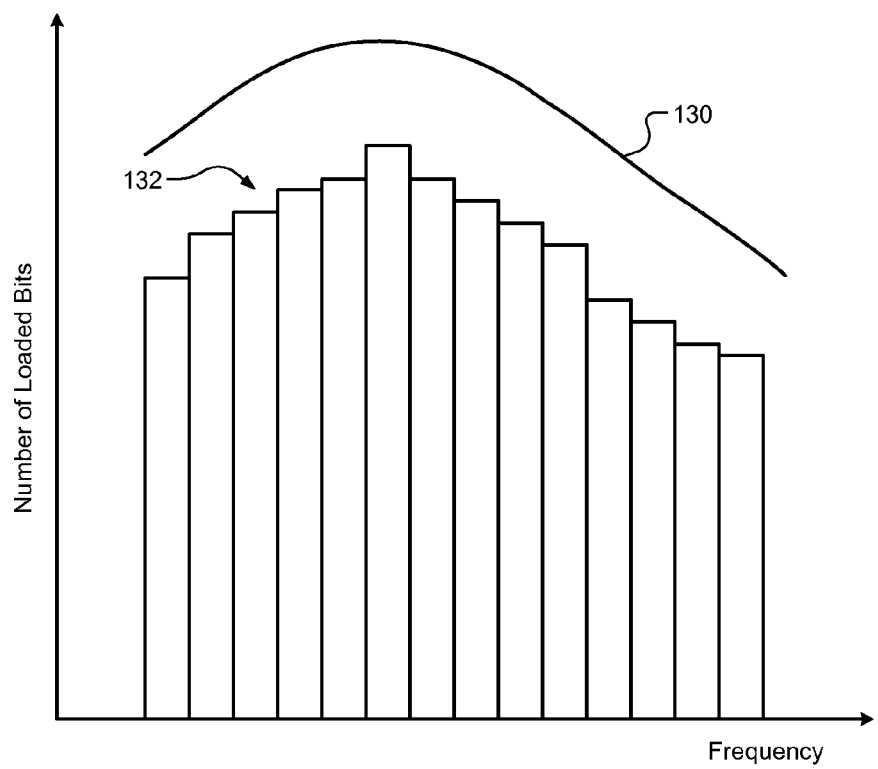
FIG. 4 is a plot illustrating frequency responses of sub-carriers and a bit loading profile in accordance with an embodiment of the present disclosure.

A communication channel of a coaxial cable often exhibits variations in frequency response (e.g., frequency magnitudes) for different frequency bands of sub-carriers. Each of the sub-carriers corresponds to a respective frequency band and may be transmitted on a frequency within the corresponding frequency band. For this reason, frequency selectivity may be performed to load the sub-carriers with respective numbers of bits. The sub-carriers may be loaded with different numbers of bits. The sub-carriers may be loaded based on the frequency response. For example, the higher the frequency response of a sub-carrier, the more bit loading for that sub-carrier. To illustrate this, FIG. 4 shows a plot illustrating frequency responses 130 of sub-carriers and a bit loading profile 132. The higher the frequency response magnitude, the more bit loading for the corresponding sub-carrier. The bit loading profile refers to the number of bits loaded on each of the sub-carriers. The number of bits loaded on a sub-carrier may refer to a maximum bit rate and/or a maximum number of bits per OFDM symbol that, for example, the coaxial PMD layer 90 of the conversion module may transmit on the sub-carrier.

The selective bit loading may be performed by the control module 60 and/or the coaxial PMD layer 90. The selective bit loading may be based on frequency responses of sub-carriers and/or other channel conditions. For example, the bit loading may be based on signal-to-noise ratios of the sub-carriers and/or modulation error rates of the sub-carriers. The control module 60 or the coaxial PMD layer 90 may update the bit loading profiles based on the channel conditions. Control signals for transmitting channel conditions and for updating the bit loading profiles are transmitted on a PHY link control channel between the coaxial PMD layer 90 and the coaxial PMD layers of the CNMs 16 (e.g., the coaxial PMD layer 120 of the CNM 100).

As an example, the PHY link control channel may be used to send (i) channel conditions from a CNM to the conversion module, and (ii) send updated bit loading profiles from the conversion module to the CNM and/or one or more other CNMs. The channel conditions and the bit loading profiles may be stored in the MDIO registers 58 and 105. The channel conditions and bit loading profiles are transferred via the PHY link control channel instead of sending MAC messages, having the channel conditions and/or bit loading profiles, along with and on the same channels as data. The EPOC network 10, the conversion module and/or the CNMs 16 may not support MAC messaging for the transfer of channel conditions and/or bit loading profiles.

Figure 5:
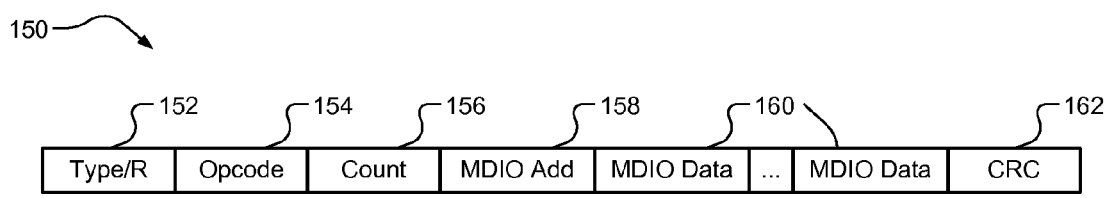
FIG. 5 is a block diagram of a physical layer format of a portion of a frame is shown in accordance with an embodiment of the present disclosure.

Referring now also to FIG. 5, which illustrates an example format 150 of a portion of a frame transmitted between a conversion module (e.g., one of the conversion modules 23, 50) and the CNMs 16 on a PHY link control channel. A PHY link protocol may be used to transfer channel conditions and bit loading profiles on the PHY link control channel. The PHY link protocol is a query and response protocol, where the conversion module transmits one or more instructions (or requests) to a CNM or a set of CNMs. The instructions may be read instructions, write instructions, and/or verify instructions. The CNMs may then perform the read, write and/or verify instructions and respond to the conversion module. If a read instruction is performed, the CNMs may respond to the conversion module with data and/or information pertaining to the read instruction. The information may include status information indicating whether a requested reporting process is complete. For example, the conversion module may request that a channel condition report be generated and provided to the conversion module. One or more of the CNMs may generate the report and transmit the report to the conversion module. If the process performed to generate the report is not completed, the corresponding CNM may respond to the conversion module indicating that the process is pending.

The instructions and information transmitted between the conversion module and the CNMs may conform to the physical layer format of a portion of a frame, as shown in FIG. 5. Downstream and/or upstream frames transmitted between the conversion module and the CNMs may each include the format 150. The format 150 may be of an extended memory block (EMB). The EMB may include a type/R field 152, an opcode field 154, a count field 156, a MDIO address field 158, one or more MDIO data fields 160 and a cyclical redundancy check (CRC) field 162. The type/R 152 field may indicate a data type or protocol type. The opcode field 154 indicates an operation code. The operation code may indicate whether an instruction (e.g., an instruction to access an MDIO register) is a write instruction, a read instruction, or a write and verify instruction. The count field 156 indicates a number of MDIO registers to be accessed based on a single instruction. The MDIO address field 158 indicates a start address of a MDIO register. The access begins at the start address and includes accessing the number of MDIO registers indicated by the count field. The MDIO data fields 160 include the data and/or values associated with the instruction. If the instruction is a read instruction, then no data and/or values are provided in the EMB of the instruction. The read data may be included in the EMB provided in response to the instruction. The CRC field 162 includes CRC bits for the recovery of data.

The instructions (e.g., instructions to access MDIO registers) are initiated at the conversion module and transmitted to one or more CNMs. The CNMs then can respond to the instruction via the PHY link control channel. In one embodiment, a first predetermined number of sub-carriers (e.g., eight sub-carriers) are used to transfer data, instructions and/or control information between the conversion module and the CNMs. The control information may include information provided in an EMB. A portion of the sub-carriers (e.g., two sub-carriers) may be dedicated for the PHY link control channel and/or for transferring instructions, control information, responses to the instructions, channel conditions, bit loading profiles, and/or reports. A first sub-carrier may be used for downstream communication (from the conversion module to the CNMs). A second sub-carrier may be used for upstream communication (from the CNMs to the conversion module).

The following FIGS. 6-9 are directed to methods that include generating and updating bit loading profiles via coaxial PMD layers of conversion modules (e.g., the conversion modules 23, 50) and CNMs (e.g., the CNMs 16). These methods include transmission of control information over a PHY link control channel. The control information includes requests, commands, and channel condition reports, as are further described below. The PHY link control channel may be a different channel than channels on which data (e.g., broadband data) is transmitted between a conversion module and the CNMs. The channels on which the data is transmitted may have a predetermined (one or more) number of consecutively allocated sub-carriers with corresponding predetermined fixed frame formats and modulation protocols. The data is spread over and transmitted on the sub-carriers. The exchange of control information over the PHY link control channel may be initiated by the conversion module. The CNMs may then respond to, for example, commands and/or information requests received from the conversion module. For example, the conversion module may request to write information to or read information from the CNMs.

The conversion modules and CNMs disclosed herein may be operated using numerous methods. Example methods are illustrated in FIGS. 6-9. The generation and updating of bit loading profiles can be implemented as described with respect to FIGS. 6 and 7 for single bit loading (BL) profile systems or as described with respect to FIGS. 8 and 9 for multiple BL profile systems. A single BL profile system refers to a system where a conversion module transmits data to the CNMs based on a single BL profile. For example, the conversion module may transmit data to one or more CNMs according to a current BL profile. The current BL profile (BL profile A) may be replaced with an updated BL profile (BL profile B). A multiple BL profile system refers to a system where a conversion module transmits data to CNMs based on two or more BL profiles. For example, the conversion module may transmit data based on a broadcast BL profile and one or more set specific BL profiles. The broadcast BL profile (broadcast BL profile A) that is currently used may be replaced with another broadcast BL profile (broadcast BL profile B). The one or more set specific BL profiles (set specific BL profiles A) that are currently used may be replaced with other set specific BL profiles (set specific BL profiles B). Thus, each of the BL profiles may have a current version (or version A) and an updated version (or version B).

Figure 6:
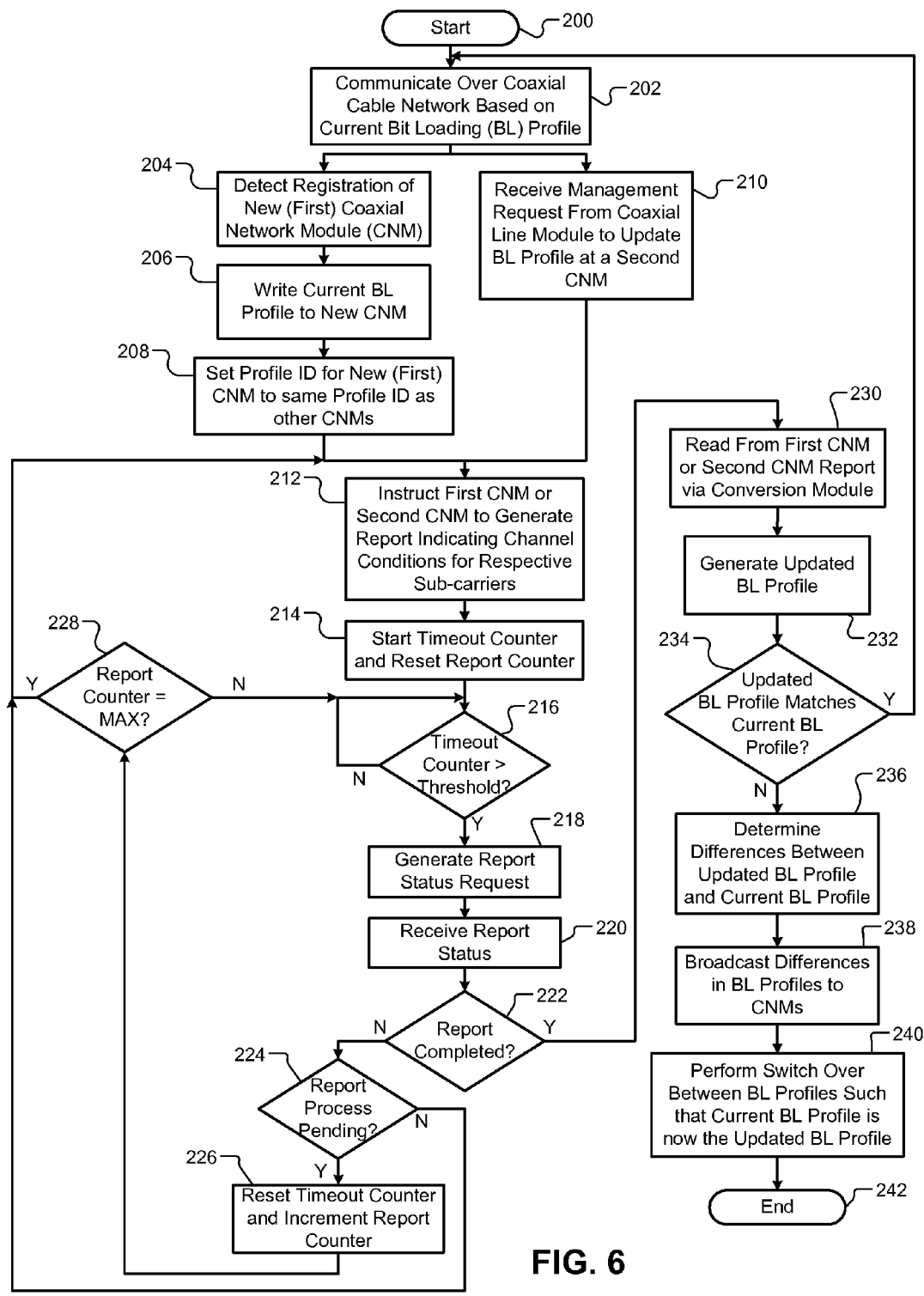
FIG. 6 illustrates a method of operating a conversion module for a single bit loading profile implementation in accordance with an embodiment of the present disclosure.

Although the following tasks of FIGS. 6-9 are primarily described with respect to the implementations of FIGS. 1-5, the tasks may be easily modified to apply to other implementations of the present disclosure. The tasks of FIGS. 6-9 may be iteratively performed. FIG. 6 illustrates a method of operating a conversion module for a single BL profile implementation. The method of FIG. 6 may begin at 200. At 202, a conversion module (e.g., the conversion module 50) and CNMs (e.g., the CNMs 16) communicate over the coaxial cable network 21 based on a current BL profile. Updating of bit loading can be triggered by two events. Thus, task 204 or task 210 may be performed subsequent to task 202.

At 204, the coaxial PHY module 56 and/or the control module 60 detect registration of a new (first) CNM in the coaxial cable network 21. Registration of the new CNM may be performed by, for example, the control module 60 and/or the MAC module 78 and may include establishing a connection with the new CNM. At 206, the coaxial PHY module 56 and/or the control module 60 write a current (active) BL profile to the new CNM. This includes transmitting the current BL profile from the MDIO registers 58 to the MDIO registers (e.g., the MDIO registers 105) of the new CNM via the coaxial PMD layer 90, the PHY link control channel, and the coaxial PHY module 104. The MDIO registers 58 and the MDIO registers 105 store the current BL profile (referred to as BL profile A) and a corresponding non-active BL profile (referred to as BL profile B). The BL profile B may be updated while the BL profile A is being used for data transfer.

At 208, the coaxial PHY module 56 and/or the control module 60 set a profile identifier (ID) for the new CNM to a same profile ID as other CNMs. The profile IDs of the CNMs may be stored in one of the MDIO registers 58. This indicates that the current BL profile to be used for the new CNM is the same BL profile currently used for the other CNMs.

At 210, the coaxial PHY module 56 receives a management request from, for example, the control module 60 or the MAC module 78 (or other module of the data link module 52). The management request requests updating a non-active BL profile at a second CNM. The management request may be generated based on a system requirement. The system requirement may be to update bit loading regularly or after every predetermined period of time. For example, bit loading may be updated every 10 minutes.

At 212, the coaxial PHY module 56 and/or the control module 60 instruct the first CNM or the second CNM via the PHY link control channel to generate a report indicating channel conditions for respective sub-carriers. The coaxial PHY module 56 and/or the control module 60 may generate an instruction signal. The instruction signal commands the first CNM or the second CNM to start calculating channel conditions for each of multiple sub-carriers and/or across one or more active frequency bands. The channel conditions, for a total number of available sub-carriers N of the active frequency bands, are written in the MDIO registers 105. The channel conditions are written as part of the report. At 214, the coaxial PHY module 56 and/or the control module 60 may start the timeout counter 96 and reset the report counter 98.

At 216, the coaxial PHY module 56 and/or the control module 60 determine whether the timeout counter has exceeded a threshold. If the timeout timer has exceeded a threshold, task 218 is performed. This causes the coaxial PHY module 56 and/or the control module 60 to wait a predetermined period before requesting statuses of the reports being generated. At 218, the coaxial PHY module 56 and/or the control module 60 send an instruction to the first CNM or the second CNM via the PHY link control channel requesting a status update with respect to the report being generated by the first CNM or the second CNM. One of the MDIO registers 105 may store one or more status bits indicating a processing status of the report. The status bits indicate whether: the process for generating the report has been started; the report is completed and is ready to be read; the report is currently being generated; or is not being generated. The coaxial PHY module 56 and/or the control module 60 may periodically poll the first CNM or the second CNM for the status bits.

At 220, the coaxial PHY module 56 and/or the control module 60 receive a status update signal from the first CNM or the second CNM. A coaxial PHY module (e.g., the coaxial PHY module 104) of the first CNM or the second CNM generates the status update signal indicating a status of the report being generated. The status update signal may include the status bits. The status update signal is transmitted via the PHY link control channel to the conversion module.

At 222, if the report is not completed task 224 is performed, otherwise task 230 is performed. At 224, if the report is being generated (i.e. the process for generating the report is not completed), task 226 is performed, otherwise task 212 is performed.

At 226, the coaxial PHY module 56 and/or the control module 60 reset the timeout counter 96 and increments the report counter 98. At 228, the coaxial PHY module 56 and/or the control module 60 determine whether the report counter 98 is equal to a predetermined maximum value MAX. If the report counter 98 is equal to the predetermined maximum value MAX, then task 212 is performed, otherwise task 216 is performed. The predetermined maximum value sets a wait period for generation of the report. If the report counter 98 equals the predetermined maximum value, then the wait period has lapsed and task 212 is repeated.

At 230, the coaxial PHY module 56 and/or the control module 60 read the report from the first CNM or the second CNM. At 232, the coaxial PHY module 56 and/or the control module 60, based on the report, update a non-active BL profile corresponding to the current (or active) BL profile. This may include adjusting bit loading of the non-active BL profile for the sub-carriers based on the channel conditions provided for the sub-carriers in the report. For example, bit loading for a particular sub-carrier may be increased if channel conditions for that sub-carrier have improved. If channel conditions for the sub-carriers have deteriorated, then the bit loading of the sub-carrier may be decreased.

As another example, the report may be compared with a sequence of pre-defined thresholds T0-T8 to determine a number of loaded bits. Predetermined numbers of loaded bits NB1-NB10 are shown. The number of loaded bits for a sub-carrier i can be determined as follows, assuming modulation performed is from 16-quadrature amplitude modulation (QAM) (4 bits) to 4096-QAM (12 bits):

```
if report[i] < T0, then
    number of bits = NB1 (e.g., 0);
Else if report[i] < T1
    number of bits = NB2 (e.g., 4);
Else if report[i] < T2
    number of bits = NB3 (e.g., 5);
Else if report[i] < T3
    number of bits = NB4 (e.g., 6);
Else if report[i] < T4
    number of bits = NB5 (e.g., 7);
Else if report[i] < T5
    number of bits = NB6 (e.g., 8);
Else if report[i] < T6
    number of bits = NB7 (e.g., 9);
Else if report[i] < T7
    number of bits = NB8 (e.g., 10);
Else if report[i] < T8
    number of bits = NB9 (e.g., 11);
Else
    number of bits = NB10 (e.g., 12);
```

Then, the number of bits for sub-carrier i and the updated BL profile (or profile B) can be obtained by taking the lesser of the number of bits determined for sub-carrier i and the number of bits for sub-carrier i as included in the current BL profile. This may be done for each of the sub-carriers to generate the updated BL profile.

At 234, the coaxial PHY module 56 and/or the control module 60 may compare the currently active BL profile (or BL profile A) to the updated non-active BL profile (or BL profile B). If there is a difference between the BL profiles A and B, then task 236 is performed, otherwise task 202 may be performed. As an alternative to performing task 202, the method may end at 242.

At 236, the coaxial PHY module 56 and/or the control module 60 may determine differences between the BL profiles A and B. At 238, the BL profile B or the differences between the profiles A and B are broadcast to the CNMs. The coaxial PHY module 56 and/or the control module 60 may send the BL profile B or the differences between the BL profiles A and B according to different writing modes of operation. During a first writing mode of operation (referred to as a direct mode), the coaxial PHY module 56 and/or the control module 60 specify a number of bits for each sub-carrier, for example, profile[i]=12. During a block mode, the coaxial PHY module 56 and/or the control module 60 can specify a block of sub-carriers with the same BL profile value (or same number of bits). In the block mode, the coaxial PHY module 56 and/or the control module 60 may send three parameters. The first parameter is an address of starting sub-carrier. The second parameter is a number of sub-carriers in a block. The third parameter is a number of bits for each of the sub-carriers in the whole block. By using the two different writing modes less information is exchanged between (i) the conversion module and (ii) the first CNM or the second CNM. Also, minimizing differences between the updated BL profile and the current BL profile and more evenly distributing and/or providing a same amount of data on each of the sub-carriers, further decreases the amount of information that is exchanged between (i) the conversion module and (ii) the first CNM or the second CNM.

At 240, the coaxial PHY module 56 and/or the control module 60 instruct the CNMs via the PHY link control channel to perform a switch over between BL profiles A and B. BL profile B becomes the current BL profile and is considered activated. BL profile A becomes the non-active profile and is considered deactivated. This causes the CNMs to receive data (e.g., broadband data) from the conversion module according to BL profile B. Subsequent to task 240, the method may end at 242.

Figure 7:
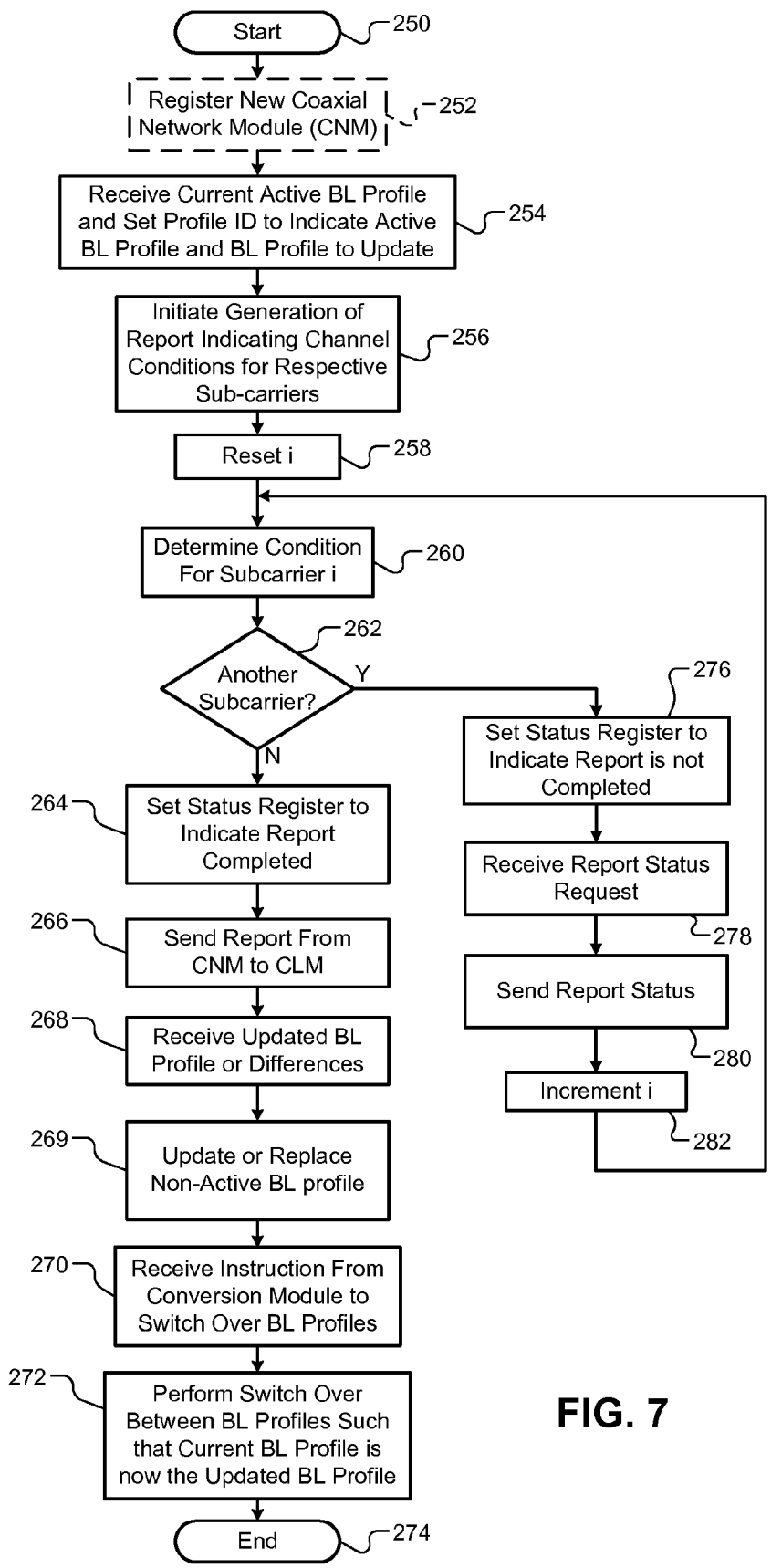
FIG. 7 illustrates a method of operating a coaxial network module for a single bit loading profile implementation in accordance with an embodiment of the present disclosure.

FIG. 7 illustrates a method of operating a CNM for a single bit loading profile implementation. The method of FIG. 7 may be performed while the method of FIG. 6 is performed. The method of FIG. 7 may begin at 250. At 252, a new CNM may be registered as being part of the coaxial cable network 21. At 254, a coaxial PHY module (e.g., the coaxial PHY module 104) and/or a control module (e.g., the control module 106) of the first CNM or the second CNM receive a current active BL profile and sets a profile ID to identify the current active BL profile and/or a non-active BL profile to update. The profile ID may be received by the coaxial PHY module and/or the control module of the first CNM and the second CNM. Each of the CNMs may have two BL profile versions (BL profile A and BL profile B). In one embodiment, the profile ID indicates whether BL profile A or BL profile B is active. In another embodiment, the profile ID may indicate whether to update BL profile A or BL profile B. Whichever one of the BL profiles A, B is being used is the current profile, while the other profile is the profile that may be updated.

At 256, the coaxial PHY module and/or the control module of the first or second CNM receive the request to generate the report from the coaxial PHY module 56 and/or the control module 60. At 258, the coaxial PHY module and/or the control module of the first or second CNM reset a sub-carrier value i. At 260, the coaxial PHY module and/or the control module of the first or second CNM determine one or more channel conditions for the sub-carrier[i]. The channel conditions may be determined based on data, signals, test signals, etc. received from the conversion module by the coaxial PHY module and/or the control module of the first or second CNM. The channel conditions may be stored as part of the report in one of the MDIO registers 105.

At 262, the coaxial PHY module and/or the control module of the first or second CNM determine whether there is another sub-carrier to update. If there is not another sub-carrier to update, task 264 is performed, otherwise task 274 is performed.

At 264, the coaxial PHY module and/or the control module of the first or second CNM set status bits in one of the MDIO registers 105 to indicate that generation of the report is completed.

At 266, the coaxial PHY module and/or the control module of the first or second CNM send the report to the coaxial PHY module 56 and/or the control module 60. At 268, the coaxial PHY module and/or the control module of the first or second CNM receive the updated BL profile or differences between the updated BL profile and the current BL profile from the coaxial PHY module 56 and/or the control module 60. At 269, the coaxial PHY module and/or the control module of the first or second CNM update or replace the non-active BL profile based on the received updated BL profile or the differences. The updated or replaced BL profile may have the profile ID provided at 254. In one embodiment, if there is a difference and/or if the differences are greater than one or more respective predetermined values, then the non-active BL profile is updated.

At 270, the coaxial PHY module and/or the control module of the first or second CNM receive an instruction from the coaxial PHY module 56 and/or the control module 60 to perform a switch over between the current active BL profile and the updated BL profile.

At 272, the coaxial PHY module and/or the control module of the first or second CNM perform the switch over and may begin receiving data (e.g., broadband data) from the conversion module according to the updated BL profile. The switch over activates the updated BL profile and deactivates the current BL profile, such that the updated BL profile becomes the current BL profile. The deactivated BL profile may then be updated in a subsequent iteration of this method. Subsequent to task 272, the method may end at 274.

At 276, the coaxial PHY module and/or the control module of the first CNM or the second CNM set the status bits to indicate that generation of the report is not completed. At 278, the coaxial PHY module and/or the control module of the first or second CNM receive a report status request from the coaxial PHY module 56 and/or the control module 60. At 280, the coaxial PHY module and/or the control module of the first or second CNM send the status bits to the coaxial PHY module 56 and/or the control module 60. At 282, the coaxial PHY module and/or the control module of the first or second CNM increment the sub-carrier value i and return to task 260.

Figure 8:
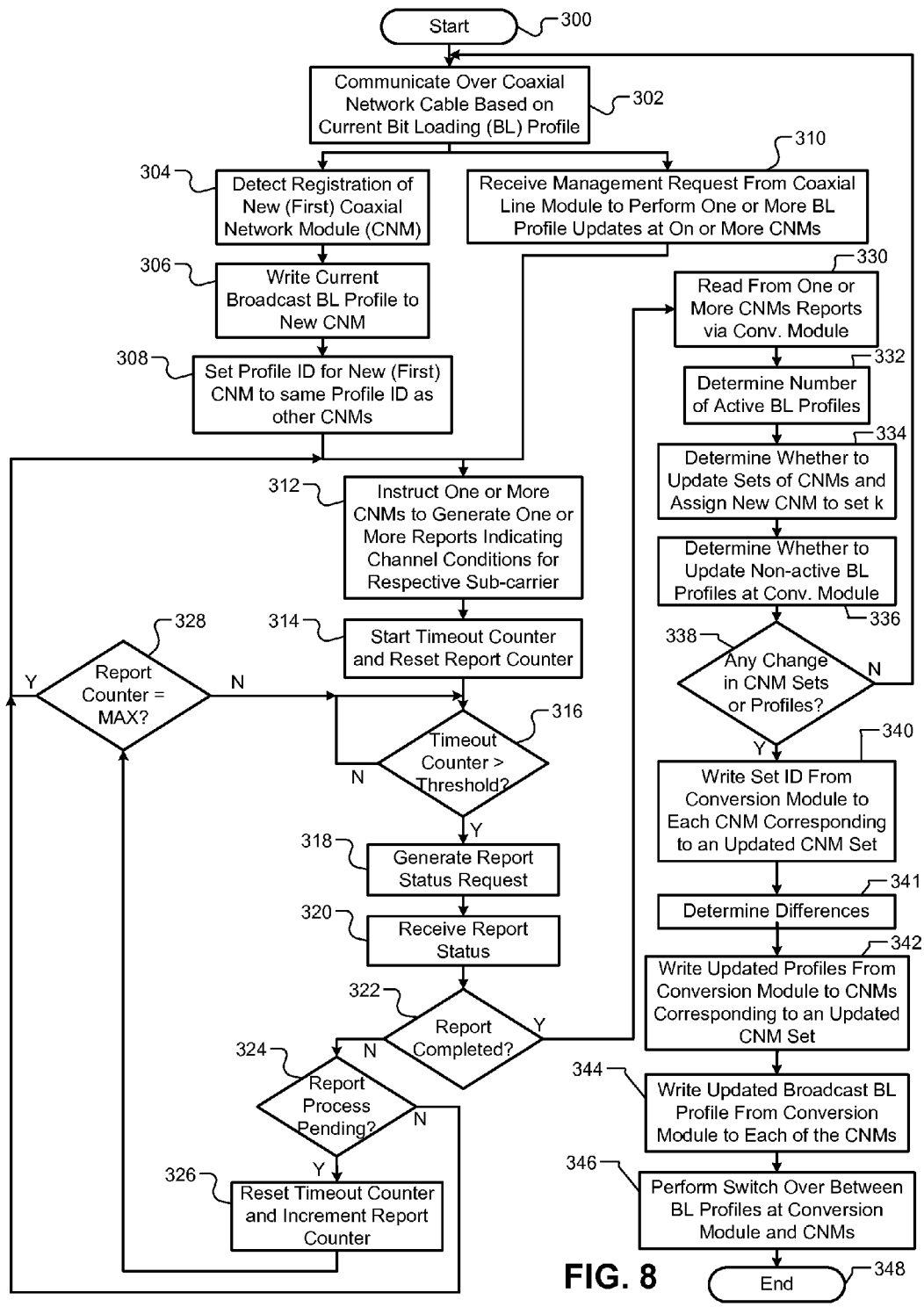
FIG. 8 illustrates a method of operating a conversion module for a multi-bit loading profile implementation in accordance with an embodiment of the present disclosure.
Figure 9:
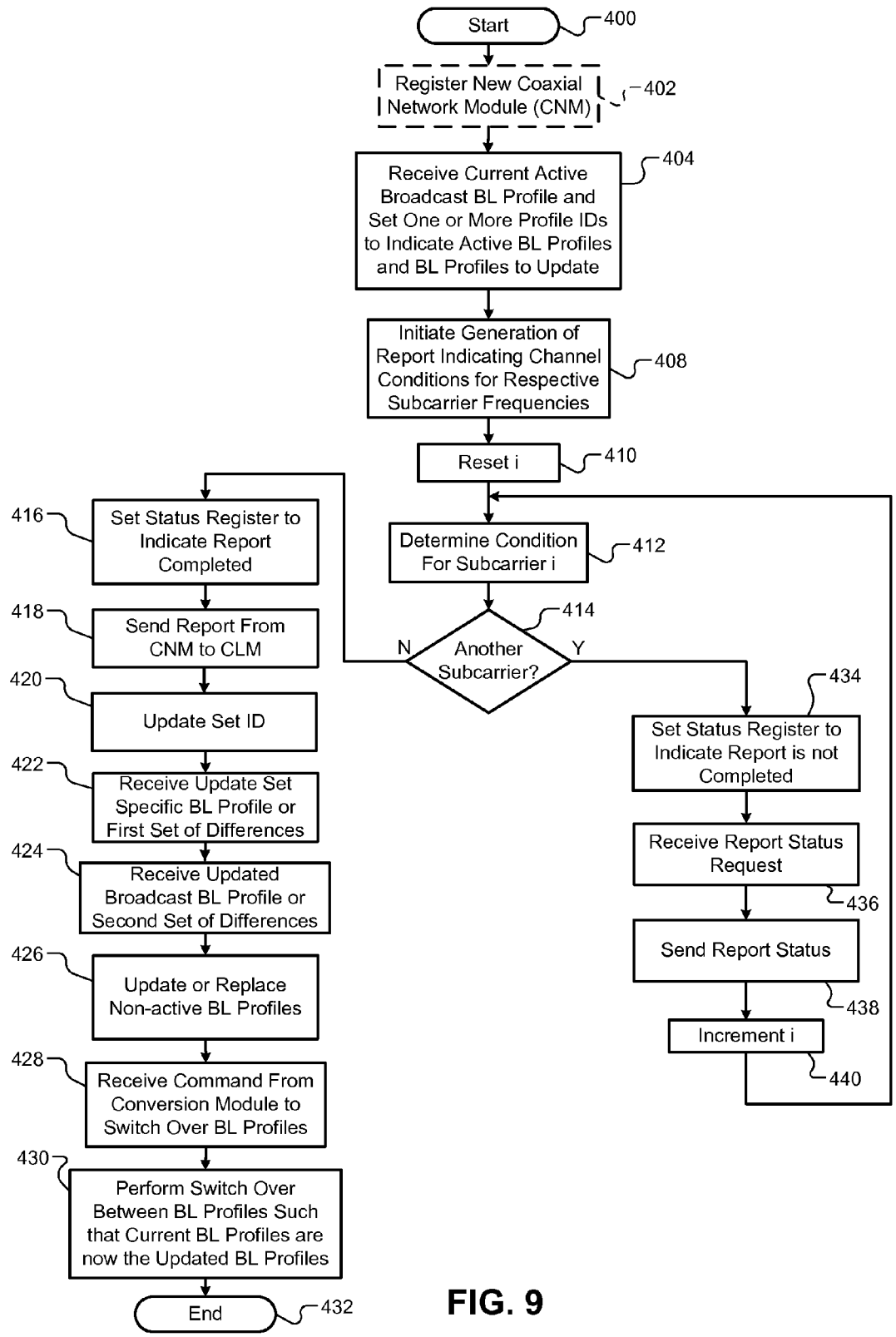
FIG. 9 illustrates a method of operating a coaxial network module for a multi-bit loading profile implementation in accordance with an embodiment of the present disclosure.

FIGS. 8 and 9 provide examples for updating multiple bit loading profiles at a conversion module (e.g., the conversion module 23 of FIG. 1) and CNMs (e.g., the CNMs 16 of FIG. 1). Maintaining and using multiple bit loading profiles improves data rates and/or a total data rate of an EPOC network (e.g., the EPOC network 10). The CNMs may be partitioned into K CNU sets, where K is the total number of sets of CNMs and the total number of set specific BL profiles. The conversion module may use one of the BL profiles (identified as BL profile k) to communicate with the CNMs in a CNM set k. The conversion module establishes the different set specific BL profiles according to respective data rates for each of the CNMs.

The conversion module may selectively update certain ones of the BL profiles. The BL profiles may be updated when a new CNM is included in one or more of the sets of CNMs and/or when the conversion module determines that a BL profile for one or more of the other CNMs is to be updated. This determination may be performed by, for example, the coaxial PHY module 56 or the control module 60. The conversion module may select one of the sets of CNMs for the new CNM by comparing a data rate for the new CNM to data rates for other CNMs. The data rates of the CNMs may be indicated by the CNMs to the conversion module and/or the conversion module may store the data rates for the CNMs. Next, the conversion module may update the BL profile for the selected set of CNMs using methods similar to the methods provided with respect to FIGS. 6-7. The conversion module may also maintain a broadcast BL profile for broadcasting data to each of the CNMs in each of the sets of CNMs. The process of updating this broadcast BL profile is similar to the single profile scenario. The methods of FIGS. 8-9 are described in more detail below.

FIG. 8 illustrates a method of operating a conversion module (e.g., the conversion module 50 of FIG. 2) for a multi-bit loading profile implementation. The method of FIG. 8 may begin at 300. At 302, the conversion module and CNMs (e.g., the CNMs 16 of FIG. 1) communicate over the coaxial cable network 21 based on a current BL profile. Updating of bit loading can be triggered by two events. Thus, task 304 or task 310 may be performed subsequent to task 302.

At 304, the coaxial PHY module 56 and/or the control module 60 detect registration of a new (first) CNM in the coaxial cable network 21. Registration of the new CNM may be performed by, for example, the control module 60 and/or the MAC module 78 and may include establishing a connection with the new CNM. At 306, the coaxial PHY module 56 and/or the control module 60 write a current broadcast BL profile to the new CNM. This includes transmitting the current broadcast BL profile from the MDIO registers 58 to MDIO registers (e.g., the MDIO registers 105) of the new CNM via the coaxial PMD layer 90, the PHY link control channel, and the coaxial PHY module 104.

At 308, the coaxial PHY module 56 and/or the control module 60 set a profile identifier (ID) for the new CNM to a same profile ID as other CNMs. The profile IDs of the CNMs may be stored in one of the MDIO registers 58. This indicates that the broadcast BL profile used for the new CNM is the same broadcast BL profile used for the other CNMs. Two versions of the broadcast BL profile may be stored in MDIO registers of each of the CNMs. A current broadcast BL profile and a broadcast BL profile to be updated.

At 310, the coaxial PHY module 56 receives a management request from, for example, the control module 60 or the MAC module 78 (or other module of the data link module 52). The management request requests updating one or more BL profiles at respective CNMs. The BL profiles may be set specific BL profiles for the CNMs. Each of the set specific BL profiles may be for a respective set of the CNMs. The management request may be generated based on a system requirement. The system requirement may be to update bit loading regularly or after every predetermined period of time. For example, bit loading may be updated every 10 minutes.

At 312, the coaxial PHY module 56 and/or the control module 60 instruct one or more CNMs via the PHY link control channel to generate a report indicating channel conditions for respective sub-carriers. The one or more CNMs may include the new CNM and/or the CNMs for which BL profile updating was requested at 310. In one embodiment the same sub-carriers are used to transmit data (e.g., broadband data) to each of the CNMs. For this reason, each of the CNMs instructed to generate a report may determine channel conditions for each of the sub-carriers. The coaxial PHY module 56 and/or the control module 60 may generate instructions signals instructing the one or more CNMs to start calculating channel conditions across one or more active frequency bands and writing the channel conditions in one of the MDIO registers of the CNMs. Channel conditions are stored for a total number of available sub-carriers N of the active frequency bands in the MDIO registers of the one or more CNMs. The channel conditions for each of the one or more CNMs are written as part of a corresponding report. At 314, the coaxial PHY module 56 and/or the control module 60 may start the timeout counter 96 and reset the report counter 98.

The following tasks 316-328 may be performed for the one or more CNMs collectively or may be performed for each of the CNMs. If tasks 316-328 are performed for each of the one or more CNMs, the different thresholds and predetermined maximum values may be used for the one or more CNMs during tasks 316 and 328.

At 316, the coaxial PHY module 56 and/or the control module 60 determine whether the timeout counter has exceeded a threshold. If the timeout timer has exceeded a threshold, task 318 is performed. This causes the coaxial PHY module 56 and/or the control module 60 to wait a predetermined period before requesting statuses of the reports being generated. At 318, the coaxial PHY module 56 and/or the control module 60 send an instruction to the one or more CNMs via the PHY link control channel requesting a status update with respect to the reports being generated by the one or more CNMs. The MDIO registers of the one or more CNMs may store one or more status bits indicating the status of the processing of the corresponding report. The status bits for each of the one or more CNMs indicate whether: the process for generating the report has been started; the report is completed and is ready to be read; the report is currently being generated; or is not being generated. The coaxial PHY module 56 and/or the control module 60 may periodically poll the one or more CNMs for the status bits.

At 320, the coaxial PHY module 56 and/or the control module 60 receive status update signals from the one or more CNMs. Coaxial PHY modules of the one or more CNMs generate status update signals indicating statuses of the reports being generated. The status update signals may include the respective status bits. The status update signals are transmitted via the PHY link control channel to the conversion module.

At 322, if the reports are not completed task 324 is performed, otherwise task 330 is performed. At 324, if the reports are being generated (i.e. the processes for generating the reports are not completed), task 326 is performed, otherwise task 312 is performed.

At 326, the coaxial PHY module 56 and/or the control module 60 reset the timeout counter 96 and increments the report counter 98. At 328, the coaxial PHY module 56 and/or the control module 60 determine whether the report counter 98 is equal to a predetermined maximum value MAX. If the report counter 98 is equal to the predetermined maximum value MAX, then task 312 is performed, otherwise task 316 is performed. The predetermined maximum value sets a wait period for generation of the reports if tasks 316-328 are performed for the one or more CNMs collectively or of the corresponding report if tasks 316-328 are performed for one of the CNMs. If the report counter 98 equals the predetermined maximum value, then the wait period has lapsed and task 312 is repeated.

At 330, the coaxial PHY module 56 and/or the control module 60 read the reports from the one or more CNMs. At 332, the coaxial PHY module 56 and/or the control module 60 determine a number of active BL profiles. One of the BL profiles may be the current broadcast BL profile. The other active BL profiles may be current set specific BL profiles for the sets of CNMs. Each set of CNMs has a respective current BL profile.

At 334, the coaxial PHY module 56 and/or the control module 60 determine whether to update the sets of CNMs and assign the new CNM to one of the sets of CNMs. Variable k identifies a number of one of the sets of CNMs. The new CNM may be assigned to the set k based on the channel conditions reported by the new CNM in the corresponding report. If the channel conditions for the new CNM match or are within predetermined ranges of the channel conditions for other CNMs in the set k, then the new CNM is assigned to the set k. The channel conditions for the new CNM may be compared to the channel conditions reported in each of the reports. The new CNM may be assigned to the set of CNMs that provides one or more reports with channel conditions, which most closely match the channel conditions reported by the new CNM. The number of sets of CNMs may be increased, maintained at a same amount, or decreased. The assignment of the CNMs to the sets of CNMs be changed based on the reported channel conditions.

At 336, the coaxial PHY module 56 and/or the control module 60 determine whether to update one or more non-active BL profiles corresponding to the active BL profiles. The coaxial PHY module 56 and/or the control module 60 generate updated BL profiles based on the reports. This may include adjusting bit loading for the sub-carriers based on the channel conditions provided for the sub-carriers in the reports. The BL profiles may be updated using the examples provided above with respect to task 232 of FIG. 6. In one embodiment, the broadcast BL profiles are not updated and are preset based on inputs from a system operator.

At 338, for each of the active BL profiles, the coaxial PHY module 56 and/or the control module 60 may compare the current (active) BL profile (or profile A) to the updated (non-active) BL profile (or profile B). If there is a difference between the profiles A and B, then task 340 is performed, otherwise task 302 may be performed. Task 340 may be performed if there are differences between corresponding profiles A and B for: one or more of the active BL profiles; one or more of the CNMs; and/or one or more of the sets of CNMs. As an alternative to performing task 302, the method may end at 348.

At 340, the coaxial PHY module 56 and/or the control module 60 write set ID from conversion module to each of the one or more CNMs corresponding to an updated set of CNMs. For example, if the new CNM is assigned to set k, then the CNMs in set k are each informed of the updated set k. This may include transmitting a set ID signal from the conversion module to the CNMs in the set k. The set ID signal may include the set ID, the number of CNMs in the set k, and/or identifiers and/or addresses of the CNMs in the set k.

At 341, the coaxial PHY module 56 and/or the control module 60 may determine differences between the BL profiles A and B corresponding to the active BL profiles.

At 342, the BL profiles B or the differences between the BL profiles A and B for each of the active set specific BL profiles are broadcast to the corresponding CNMs. The coaxial PHY module 56 and/or the control module 60 may send the BL profiles B or the differences between the BL profiles A and B according to different writing modes of operation. The number of bits for each sub-carrier and/or BL profile values may be transmitted using the above-described direct mode and/or block mode. At 344, the BL profile B or the differences between the BL profiles A and B for the active broadcast BL profile to each of the CNMs.

At 346, the coaxial PHY module 56 and/or the control module 60 instruct the CNMs via the PHY link control channel to perform a switch over between profiles A and B for the non-active BL profiles that have been updated. Profile B becomes the current (active) BL profile. Profile A becomes the non-active BL profile. This causes the CNMs to receive data (e.g., broadband data) from the conversion module according to the updated BL profiles B. Subsequent to task 346, the method may end at 348.

FIG. 9 illustrates a method of operating a CNM (e.g., the CNM 100 of FIG. 3) for a multi-bit loading profile implementation. The method of FIG. 9 may be performed while the method of FIG. 8 is performed. The method of FIG. 9 may begin at 400. At 402, a new CNM may be registered as being part of the coaxial cable network 21. At 404, coaxial PHY modules (e.g., coaxial PHY modules 30, 104 of FIGS. 1 and 3) and/or control modules (e.g., the control module 106 of FIG. 3) of each of multiple CNMs in each of multiple sets of CNMs receive an instruction signal including a current active broadcast BL profile and one or more set profile IDs. The coaxial PHY modules and/or the control modules of the CNMs set currently used BL profiles based on the received one or more profile IDs. The one or more profile IDs identify one or more active BL profiles and/or one or more BL profiles to update. The one or more active BL profiles include the current active broadcast BL profile. Each CNM may have two BL profile versions (BL profile A and BL profile B) for the broadcast BL profile and for a set specific BL profile. The profile IDs may indicate whether to update profiles A or profiles B. Whichever ones of the profiles A, B are being used are the current profiles, while the other profiles are the profiles that may be updated.

At 408, the coaxial PHY modules and/or the control modules of each of the CNMs in each of the sets of CNMs receive a request to generate a report from the coaxial PHY module 56 and/or the control module 60. At 410, the coaxial PHY modules and/or the control modules of each of the CNMs in each of the sets of CNMs reset a corresponding sub-carrier value i. At 412, the coaxial PHY modules and/or the control modules of the CNMs in each of the sets of CNMs determine one or more channel conditions for the sub-carrier[i]. The channel conditions may be determined based on data, signals, test signals, etc. received from the conversion module by the coaxial PHY modules and/or the control modules of the one or more CNMs. The channel conditions may be stored as part of the corresponding report in one of the MDIO registers of the corresponding CNM.

At 414, the coaxial PHY modules and/or the control modules of each of the CNMs in each of the sets of CNMs determine whether there is another sub-carrier to update. If there is not another sub-carrier to update, task 416 is performed, otherwise task 434 is performed.

At 416, the coaxial PHY modules and/or the control modules of each of the CNMs in each of the sets of CNMs set status bits in a MDIO register to indicate that generation of the corresponding report is completed.

At 418, the coaxial PHY modules and/or the control modules of each of the CNMs in each of the sets of CNMs send the report to the coaxial PHY module 56 and/or the control module 60. At 420, the coaxial PHY module and/or the control module of the new CNM and/or the coaxial PHY modules and/or the control modules of one or more of the other CNMs receives an updated set ID from the conversion module.

At 422, the coaxial PHY modules and/or the control modules of each of the CNMs in each of the sets of CNMs receive, from the coaxial PHY module 56 and/or the control module 60, (i) an updated set specific BL profile for the corresponding set of CNMs, or (ii) differences between the updated set specific BL profile and a current set specific BL profile (referred to as a first set of differences). At 424, the coaxial PHY modules and/or the control modules of each of the CNMs in each of the sets of CNMs receive, from the coaxial PHY module 56 and/or the control module 60, (i) an updated broadcast BL profile, or (ii) differences between the updated broadcast BL profile and the current broadcast BL profile (referred to as a second set of differences).

At 426, the coaxial PHY modules and/or the control modules of CNMs in one or more of the sets of CNMs update or replace the non-active BL profiles having the profile IDs based on the received updated BL profiles and/or the corresponding differences. The one or more sets of CNMs are sets of: the new CNM; a CNM with a non-active BL profile that has been updated at the conversion module and received at 422 or 424; a CNM with a non-active BL profile having corresponding differences received at 422 or 424; and/or a CNM with a non-active BL profile having corresponding differences received at 422 or 424 that are greater than one or more predetermined values.

At 428, the coaxial PHY modules and/or the control modules of the CNMs that have the BL profiles that have been updated at 426 receive instructions from the coaxial PHY module 56 and/or the control module 60 to perform a switch over between the current active BL profiles and the updated BL profiles.

At 430, the coaxial PHY modules and/or the control modules of the CNMs that have the BL profiles that have been updated at 426 perform a switch over and may begin receiving data (e.g., broadband data) from the conversion module according to the updated BL profiles. The switch over activates the updated BL profile and deactivates the corresponding current BL profile, such that the updated BL profile becomes the current BL profile. The deactivated BL profile may then be updated in a subsequent iteration of this method. Subsequent to task 430, the method may end at 432.

At 434, the coaxial PHY modules and/or the control modules of each of the CNMs in each of the sets of CNMs set the status bits to indicate that generation of the reports is not completed. At 436, the coaxial PHY modules and/or the control modules of each of the CNMs in each of the sets of CNMs receive report status requests from the coaxial PHY module 56 and/or the control module 60. At 438, the coaxial PHY modules and/or the control modules of each of the CNMs in each of the sets of CNMs send the status bits to the coaxial PHY module 56 and/or the control module 60. At 440, the coaxial PHY modules and/or the control modules of each of the CNMs in each of the sets of CNMs increments the sub-carrier value i and returns to task 412.

The above-described tasks of FIGS. 6-9 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A conversion circuit comprising:
  a physical layer circuit configured to, via an optical network, receive first data from a terminal of a service provider; and
  a control circuit configured to, via a coaxial cable network,
    transmit the first data, via a plurality of sub-carriers, from the conversion circuit to a first network circuit according to a first bit loading profile, wherein the first bit loading profile specifies a first number of bits to transmit per sub-carrier,
    request a report from the first network circuit or a second network circuit, wherein the report indicates channel conditions respectively for the plurality of sub-carriers,
    based on the request, receive the report from the first network circuit or the second network circuit,
    update a second bit loading profile based on the report, wherein the second bit loading profile specifies a second number of bits to transmit per sub-carrier,
    transmit, to the first network circuit or the second network circuit, the second bit loading profile or a difference between the first bit loading profile and the second bit loading profile, wherein the difference corresponds to a difference between the first number of bits to transmit per sub-carrier and the second number of bits to transmit per sub-carrier, and
    subsequent to performing a switch over between the first bit loading profile and the second bit loading profile, transmit second data according to the second bit loading profile to the first network circuit or the second network circuit.

2. The conversion circuit of claim 1, wherein the control circuit is configured to:
  via a first channel, transmit the first data from the conversion circuit to the first network circuit; and via a second channel,
request the report,
receive the report from the first network circuit or the second network circuit, and
transmit to the first network circuit or the second network circuit (i) the second bit loading profile, or (ii) the difference between the first bit loading profile and the second bit loading profile, and
wherein the second channel is different than the first channel and is dedicated for transmission of control information including the channel conditions, the first bit loading profile and the second bit loading profile between (i) the conversion circuit and (ii) the first network circuit and the second network circuit.

3. The conversion circuit of claim 1, wherein:
the physical layer circuit is configured to receive a time division multiplexed signal from the terminal of the service provider;
the time division multiplexed signal includes the first data;
the control circuit is configured to transmit an orthogonal frequency division multiplexing signal to the first network circuit or the second network circuit; and
the orthogonal frequency division multiplexing signal includes the second data.

4. The conversion circuit of claim 1, further comprising a data link circuit configured to receive the first data and the second data from the physical layer circuit,
wherein the control circuit is configured to receive the first data and the second data from the data link circuit.

5. The conversion circuit of claim 1, wherein the report indicates a plurality of channel conditions for each of the plurality of sub-carriers.

6. The conversion circuit of claim 1, wherein each of the channel conditions is a signal-to-noise ratio, a modulation error rate, or a frequency response.

7. The conversion circuit of claim 1, wherein the control circuit is configured to:
transmit the first data to a first network device, wherein the first network device includes the first network circuit; and
transmit the second data to a second network device, wherein the second network device includes the second network circuit.

8. The conversion circuit of claim 1, wherein is the control circuit configured to:
transmit portions of the first data to the first network circuit or the second network circuit respectively on the plurality of sub-carriers; and
transmit portions of the second data to the first network circuit or the second network circuit respectively on the plurality of sub-carriers.

9. The conversion circuit of claim 1, wherein the control circuit is configured to:
wait a predetermined period after requesting the report to request a status of the report from the first network circuit or the second network circuit;
subsequent to the predetermined period, request the status of the report from the first network circuit or the second network circuit; and
based on whether the report is completed, update the second bit loading profile.

10. The conversion circuit of claim 1, wherein the control circuit is configured to, subsequent to updating the second bit loading profile:
determine the difference between the first bit loading profile and the second bit loading profile;
determine whether the difference is greater than a predetermined value; and
instruct the first network circuit or the second network circuit to perform the switch over between the first bit loading profile and the second bit loading profile.

11. The conversion circuit of claim 1, wherein:
control circuit is in communication with a plurality of network circuits of respective end user devices, wherein the plurality of network circuits include the first network circuit and the second circuit;
the physical layer circuit is configured to receive a time division multiplexed signal from the terminal of the service provider;
the time division multiplexed signal includes a plurality of sets of data in respective time slots;
the time slots are allocated to the conversion circuit and the plurality of network circuits; and
the control circuit is configured to (i) generate a plurality of orthogonal frequency division multiplexing signals based on the plurality of sets of data, and (ii) transmit the plurality of orthogonal frequency division multiplexing signals respectively to the plurality of network circuits.

12. The conversion circuit of claim 1, wherein the control circuit is configured to:
select a set of network circuits for the second network circuit based on the report;
indicate the set of network circuits to the first network circuit and the second network circuit; and
transmit, to the second network circuit, the second bit loading profile or the difference between the first bit loading profile and the second bit loading profile.

13. A first network circuit of an end user device, the first network circuit comprising:
a first register configured to store a first bit loading profile and a second bit loading profile, wherein the first bit loading profile indicates bit loading for each of a plurality of sub-carriers of a first channel, and wherein the second bit loading profile indicates bit loading for each of the plurality of sub-carriers of the first channel; and
a control circuit configured to
via a coaxial cable network and according to the first bit loading profile, receive first data on the plurality of sub-carriers of the first channel, wherein the data is received from a terminal of a service provider via an optical network and a conversion circuit,
receive a request for a report from the conversion circuit on a second channel,
based on the request, determine a channel condition for each of the plurality of sub-carriers,
generate the report to include the channel conditions for the plurality of sub-carriers,
transmit the report to the conversion circuit on the second channel,
based on the report, receive from the conversion circuit on the second channel (i) an updated version of the second bit loading profile, or (ii) a difference between the first bit loading profile and the updated version of the second bit loading profile, and
according to the second bit loading profile or the difference, receive second data on the plurality of sub-carriers of the first channel from the conversion circuit.

14. The first network circuit of claim 13, wherein the control circuit is configured to receive the first bit loading profile from the conversion circuit on the second channel.

15. The first network circuit of claim 13, wherein the control circuit is configured to:
- receive a first orthogonal frequency division multiplexing signal on the plurality of sub-carriers of the first channel, wherein the first orthogonal frequency division multiplexing signal comprises the first data; and
- receive a second orthogonal frequency division multiplexing signal on the plurality of sub-carriers of the first channel, wherein the second orthogonal frequency division multiplexing signal comprises the second data.

16. The first network circuit of claim 13, wherein the report indicates a plurality of channel conditions respectively for each of the plurality of sub-carriers.

17. The first network circuit of claim 13, further comprising a second register, wherein the control circuit is configured to:
- while generating the report, update a status value stored in the second register, wherein the status value indicates whether the report is completed;
- transmitting the status value to the conversion circuit;
- if the status value indicates generation of the report is completed, receiving a request signal from the conversion circuit, wherein the request signal requests the report; and
- in response to the request signal, transmitting the report to the conversion circuit.

18. The first network circuit of claim 13, wherein the control circuit is configured to:
- based on the report, receive the difference between the first bit loading profile and the second bit loading profile from the conversion circuit;
- based on the difference, receive an instruction from the conversion circuit; and
- in response to the instruction, switch from the first bit loading profile to the second bit loading profile.

19. The first network circuit of claim 13, wherein the control circuit is configured:
- receive portions of the first data from the conversion circuit respectively on the plurality of sub-carriers; and
- receive portions of the second data from the conversion circuit respectively on the plurality of sub-carriers.

20. The first network circuit of claim 13, wherein the control circuit is configured to:
- receive, according to a third bit loading profile, third data broadcast to the first network circuit and a second network circuit, wherein the first network circuit and the second network circuit are members of a same set of network circuits;
- receive from the conversion circuit (i) an updated version of a fourth bit loading profile, or (ii) a second difference between the third bit loading profile and the updated version of the fourth bit loading; and
- receive, according to the fourth bit loading, fourth data broadcast to the first network circuit and the second network circuit.

\* \* \* \* \*